July 25, 1950 J. GOSSWEILER 2,516,824
APPLIANCE ON MOTOR VEHICLES FOR OPERATING HYDRAULIC
VEHICLE BRAKES AND FOR REGULATING THE FUEL FEED TO
THE ENGINE BY MEANS OF ONE SINGLE PEDAL
Filed Jan. 24, 1949
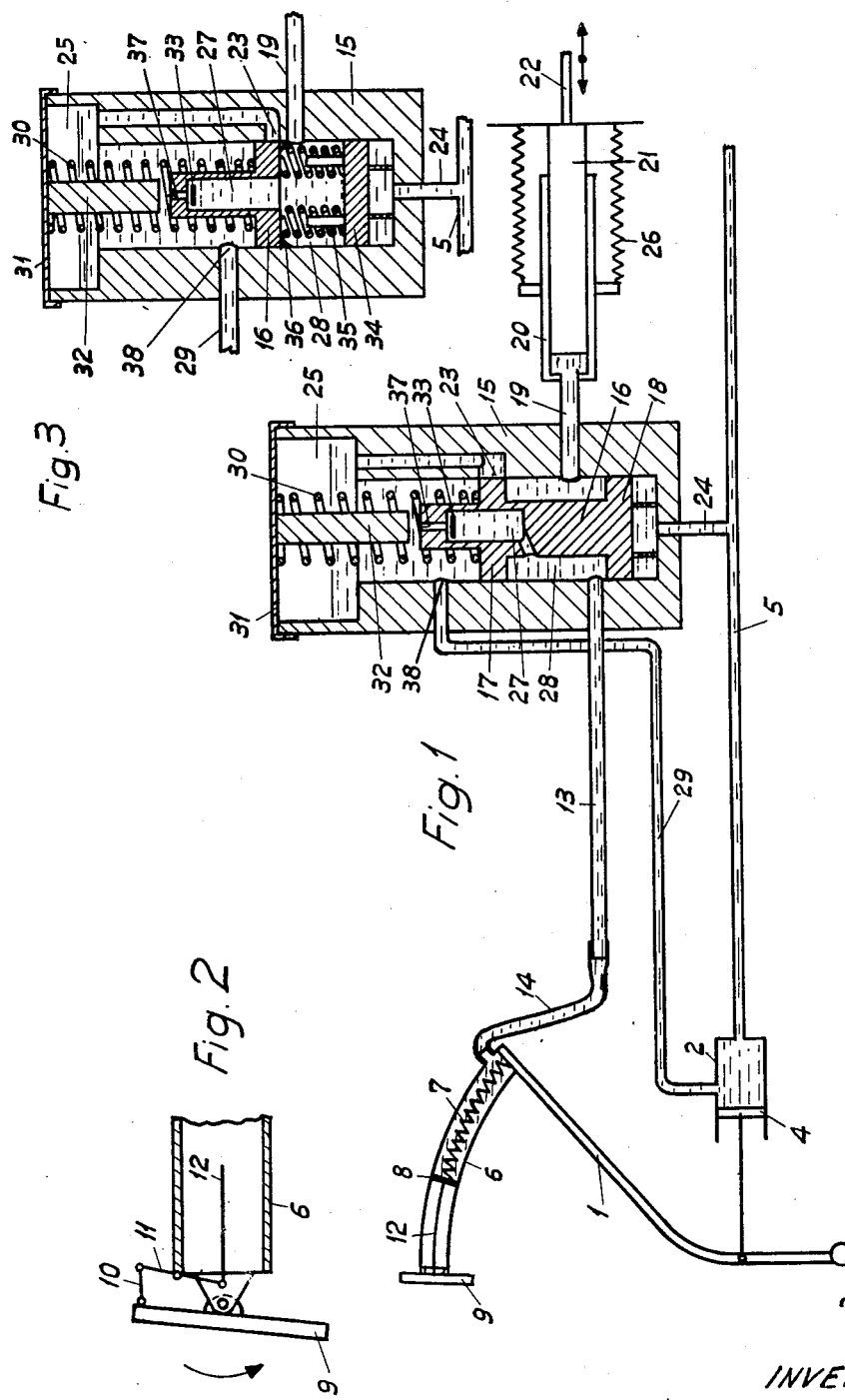
INVENTOR
JAKOB GOSSWEILER Patented July 25, 1950

2,516,824

UNITED STATES PATENT OFFICE 2,516,824

APPLIANCE ON MOTOR VEHICLES FOR OPERATING HYDRAULIC VEHICLE BRAKES AND FOR REGULATING THE FUEL FEED TO THE ENGINE BY MEANS OF ONE SINGLE PEDAL

Jakob Gossweiler, Dubendorf, near Zurich, Switzerland

Application January 24, 1949, Serial No. 72,504
In Switzerland January 21, 1948

7 Claims. (Cl. 192—3)

The invention relates to an appliance adapted for use on motor vehicles for operating hydraulic vehicle brakes and for regulating the fuel feed to the engine by means of a single pedal.

One of the main objects of the invention is to provide means rendering possible a simple and mutually relatively quick-acting operation of the foot brake and control of the fuel feed in motor vehicles, in order, for instance, to be able to allow the brake to act as quickly as possible when any danger is recognized, whereby during the braking operation the fuel feed to the engine is automatically throttled, since simultaneous acting of the foot brake and acceleration of the engine is not desired. The appliance according to the invention is further characterized in that, to the hydraulic brake system of the vehicle, a cylinder with a control piston is connected, and that this cylinder also communicates with a servomotor for controlling the fuel feed to the engine, the cylinder being provided with an overflow opening controlled by the control piston through which liquid under pressure from the system of the said servo-motor can flow away into a tank where substantially no pressure exists, thus interrupting the fuel feed to the engine, the control piston being under the influence of the pressure in the braking system and spring-loaded in such a way that the overflow opening is closed by the control piston at a pressure lower than the braking pressure in the braking system.

A preferred example of execution of the invention is diagrammatically illustrated in the drawing:

Fig. 1 shows schematically an embodiment of the invention with the footplate of the pedal mounted for tipping action.

Fig. 2 shows schematically in detail the tipping mechanism of the pedal footplate.

In the figures the same parts are designated by the same reference numerals.

According to Fig. 1 the pedal lever 1 is connected in the usual manner to a main-brake cylinder 2 of the hydraulic vehicle brake. The pedal lever 1 is connected to the vehicle by means of the pivot pin 3. The pressure exerted on the liquid by the piston 4 when braking, is propagated through the brake-pressure pipe 5 to the brake drums on the wheels of the vehicle (not shown).

On the pedal lever 1, which is rotatable round the pin 3, an arc-shaped, hydraulic main cylinder 6 for the fuel-feed control is mounted concentrically to the pin 3, and in this cylinder a piston 8 loaded by the spring 7 is provided, which is connected mechanically to the tipping mechanism of the pedal 9.

In Fig. 2 the footplate or pedal 9 and the cylinder 6 are shown in greater detail and partly in section, so that the functioning of the tipping mechanism can be better understood. By tipping the footplate in the direction of the arrow, the lever 11 is swung in the same direction through the link 10, so that the piston rod 12 is pushed into the cylinder 6. By such tipping of the footplate, a pressure is consequently exerted by means of the piston 8 on the liquid present in the main cylinder 6. The spring 7 acts in the opposite direction, so that, when the footplate is let loose, it automatically turns back into its initial position and the hydraulic control system for the fuel feed is relieved.

Between the main cylinder 6 and a liquid pipe 13 fixedly mounted on the vehicle, a flexible tube connection is provided, for instance, a rubber tubing 14, so that the cylinder 6 can be moved relatively to the pipe 13 during a braking operation. The pipe 13 is connected to a cylinder 15, in which an hydraulic control piston 16 is located, this piston being I-shaped in axial cross section. When the pedal is in the initial or running position, i. e., with unloaded brake-pressure pipe and loaded gas-feed control system, the control piston is in the lower position illustrated in Fig. 1. The pipe 13 in this case opens into the cylinder space 28 between the two flanges 17 and 18 of the control piston. A pipe 19 leads from the cylinder space 28 to the servo-motor 20, to whose piston 21 e. g. the carburetor linkage 22 is connected. The overflow opening 23 on the cylinder 15 is then closed by the upper flange 17 of the control piston 16. Consequently, a tipping of the footplate or pedal 9 causes a corresponding movement of the carburetor linkage 22 and thereby control of the gas feed.

When braking, the pedal lever 1 is rotated clockwise to further position round the pin 3 seen in Fig. 1, so that pressure in the brake-pressure pipe is increased. Thus the brakes are actuated. But before the brake operation takes place, the pressure is propagated in the cylinder 15 through the connecting piping 24 to the under side of the control piston 16 so that the latter is displaced or raised. The overflow opening 23 is cleared and opened, so that the pressure between the fuel-feed control system and the liquid tank 25 will be equalized, and the fuel feed is automatically throttled in consequence of the action of the retracting springs 26 fitted on the servo-motor 20. Through the control piston 16 an opening or conduit 27 passes, which connects the tank 25 with the cylinder space 28. Within this connection a float plate-valve or check valve 33 is fitted in such a way that liquid can flow only from the tank 25 back into the cylinder space 28, but not in the opposite direction. This recharge or return flow of the liquid from the tank into the cylinder space and thereby through return flow pipe connection 13 into the control system for the fuel feed, may only take place when the control system is relieved. The tank 25 is further connected to the main-brake cylinder 2 through a pipe 29, so that any liquid for the hydraulic brake system is returned from the tank through this pipe. The pipe 29 opens into the cylinder 2 in such a way that this opening is closed by the piston 4 during the braking operation, so that the braking pressure is propagated only through the pipe 5. The control piston 16 is pressed downwards by the action of the spring 30 at one side of the control piston when the brake system is relieved, so that the overflow opening 23 is again closed. The spring 30 is thereby supported against the closing cover 31 and surrounds a stop bolt 32 which serves to limit the lift of the piston 16.

It can be seen that, for obtaining the desired brake pressure in the braking system, the full-load position of the pedal must be passed through, but when the pedal is pressed down quickly, this causes no disadvantageous accelerating of the engine, since there is too little time for that. Nevertheless, for the sake of safety, a contact breaker dependent on the pressure can be connected to the pipe 19, so that the electric circuit for the ignition system is broken if any overpressure occurs in the fuel-feed control system.

It can be seen from Fig. 1 that the return opening 37 for the liquid to the fuel-feed control system is arranged at a higher level than the inlets 38 of the pipes 29. Because of this, any lack of liquid in the system will first of all make itself felt in the control of the fuel feed. Consequently in this case the vehicle can no longer be accelerated, but on the other hand the brakes can still act. In this manner the driver of the vehicle will have his attention automatically called to the fact that the oil level of the brake system is too low, and thus accidents occurring in consequence of non-functioning of the brakes may be avoided.

It can thus be seen that there has been provided in accordance with the present invention a device for use on motor vehicles having a hydraulic vehicle brake system and a fuel feed system leading to the engine and operated by means of a single pedal; a control cylinder, a control piston displaceable in said cylinder and provided with a recess, a tank at one end of said cylinder, said cylinder being provided with an overflow opening communicating with said tank and adapted to establish connection between said tank and said recess in predetermined position of said control piston, spring means acting on said piston to normally close said overflow opening, said control cylinder being operatively connected to said pedal which operates said brake system and fuel feed system, a further connection leading from said brake system to the other end of said control cylinder and opposite to that of said tank, said pedal upon initial actuation presses liquid to said recess of said control piston to bring about operation of said fuel feed system, whereas upon further actuation of said pedal said brake system is operated and liquid under pressure pressed into said control cylinder at the other end thereof through said further connection to thereby displace said piston and to bring about communication between said tank, said recess and said fuel feed system through said overflow opening thereby equalizing the liquid pressure exertable by said pedal in said liquid fuel feed system, and valve-controlled return flow means associated with said control piston and adapted to establish communication between said tank and said fuel feed system when said control piston is displaced to said predetermined position.

Having thus described the invention, what is claimed as new and desired to be secured by Letters Patent is:

1. In a control device of the character described adapted for use on motor vehicles equipped with a single pedal for actuating a hydraulic brake system and a hydraulically operated fuel feed system; a control cylinder including pipe connections leading, respectively, to said hydraulic brake system and to said fuel feed system, a control piston displaceable in said cylinder, a tank containing a liquid at one end of said cylinder, said cylinder being provided with an overflow opening controlled by said piston, spring means at said one end of said cylinder for actuating said piston and to normally maintain the same in position to close said overflow opening, said overflow opening communicating with said tank, said pedal when acting on said brake system being adapted to force hydraulically a displacement of said piston within said cylinder against the action of said spring means so as to open said overflow opening, whereby liquid under pressure from said fuel feed system is adapted to stream through said overflow opening into said tank to thereby equalize the liquid pressure and to interrupt the fuel feed to the motor, a conduit passing through said control piston and in communication with said fuel feed system and said tank, and a check valve arranged in said conduit and adapted to open into said cylinder and to permit return flow of liquid from said tank through said pipe connection of said fuel feed system into the latter.

2. A control device according to claim 1, including a return flow pipe connection between said control cylinder and said hydraulic brake system, said return flow pipe connection leading from said tank at a level lower than the end of said conduit adjacent said tank, which latter communicates with said fuel feed system through said conduit.

3. A control device according to claim 1, wherein said pipe connection of said hydraulically operated fuel feed system includes a flexible tube connected to said pedal.

4. A control device according to claim 1, wherein said fuel feed system includes a servo-motor connected to said control cylinder, said control piston being substantially I-shaped in cross-section.

5. A control device according to claim 1, wherein a further pipe connection is provided in said hydraulic brake system and connects the latter with said cylinder at the other end thereof which is positioned opposite said one end of said cylinder at which said spring means and tank are located.

6. In a device for use on motor vehicles having a hydraulic vehicle brake system and a fuel feed system leading to the engine and operated by means of a single pedal acting on two different pistons, respectively, of said hydraulic brake system and said fuel feed system, a control cylinder having respective pipe connections to said fuel feed system and said brake system, whereby said pistons of said brake system and of said fuel feed system displace a liquid under pressure in the direction of said control cylinder, a control piston displaceable in said control cylinder, said control cylinder being provided with an overflow opening, a tank connected to said cylinder and containing a liquid normally under atmospheric pressure and in communication with said overflow opening, spring means acting on said control piston to substantially maintain the same in a position to close said overflow opening, a conduit extending through said control piston and including a check valve within said conduit, said conduit being adapted to communicate through said valve with said fuel feed system, whereby liquid may flow from said tank through said conduit into said fuel feed system, said pedal when operated to actuate said piston of said brake system forcing liquid under pressure against said control piston to displace the same and to clear said overflow opening, whereby communication of said fuel feed system with said tank through said overflow opening takes place so that the liquid pressure from said fuel feed system will be substantially equalized and fuel feed to said engine interrupted, said control piston being provided with a recess in communication with said hydraulic fuel feed system and arranged to cooperate with said overflow opening.

7. In a device for use on motor vehicles having a hydraulic vehicle brake system and a fuel feed system leading to the engine and operated by means of a single pedal; a control cylinder, a control piston displaceable in said cylinder and provided with a recess, a tank at one end of said cylinder, said cylinder being provided with an overflow opening communicating with said tank and adapted to establish connection between said tank and said recess in predetermined position of said control piston, spring means acting on said piston to normally close said overflow opening, said control cylinder being operatively connected to said pedal which operates said brake system and fuel feed system, a further connection leading from said brake system to the other end of said control cylinder and opposite to that of said tank, said pedal upon initial actuation presses liquid to said recess of said control piston to bring about operation of said fuel feed system, whereas upon further actuation of said pedal said brake system is operated and liquid under pressure pressed into said control cylinder at the other end thereof through said further connection, to thereby displace said piston and to bring about communication between said tank, said recess and said fuel feed system through said overflow opening thereby equalizing the liquid pressure exertable by said pedal in said liquid fuel feed system, and check valve-controlled return flow means associated with said control piston and adapted to establish communication between said tank and said fuel feed system when said control piston is displaced to said predetermined position.

JAKOB GOSSWEILER.

REFERENCES CITED

The following references are of record in the file of this patent:

UNITED STATES PATENTS

| Number | Name | Date |
|---|---|---|
| 2,165,320 | Weiss | July 11, 1939 |
| 2,203,777 | Detmers | June 11, 1940 |
| 2,338,244 | Hoyes | Jan. 4, 1944 |
| 2,362,723 | Sanford | Nov. 14, 1944 |

FOREIGN PATENTS

| Number | Country | Date |
|---|---|---|
| 521,352 | Great Britain | May 20, 1940 |